Figure 1:
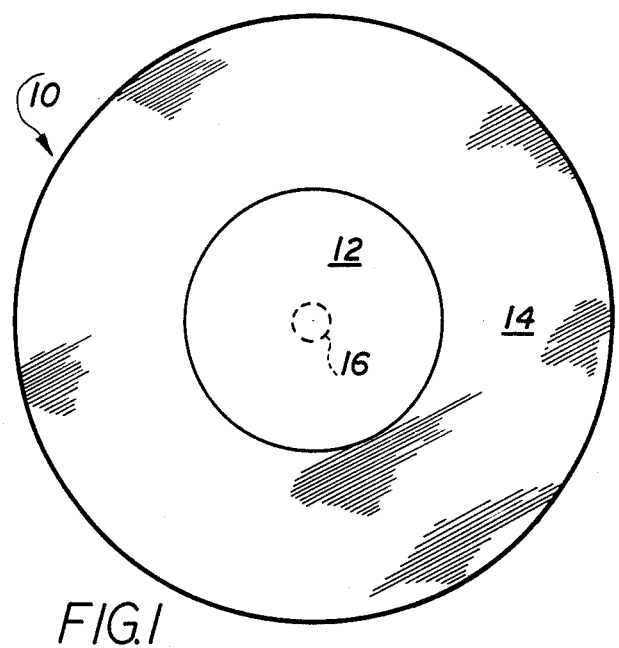
Figure 2:
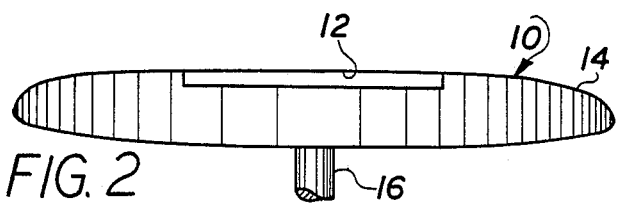
Figure 3:
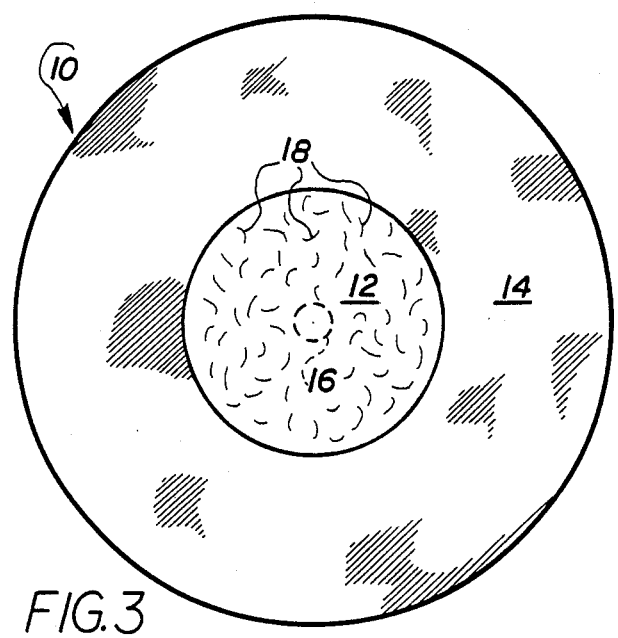
Figure 4:
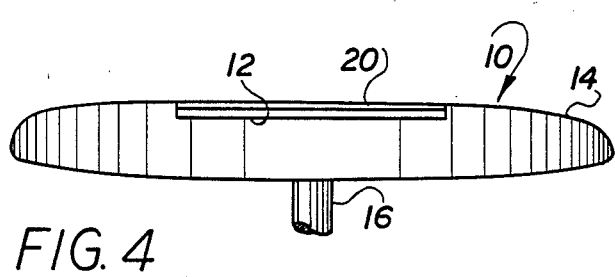

United States Patent [19]

Davidson et al.

[11] Patent Number: 4,932,254

[45] Date of Patent: Jun. 12, 1990

[54] DETECTOR FOR DRY DEPOSITION OF ATMOSPHERIC CONTAMINANTS HAVING A COATING CAPABLE OF RETAINING CONTAMINANTS

[75] Inventors: Cliff I. Davidson; Gregory J. McRae, both of Pittsburgh; James S. Gamble, Jeannette, all of Pa.

[73] Assignee: Carnegie-Mellon University, Pittsburgh, Pa.

[21] Appl. No.: 208,258

[22] Filed: Jun. 17, 1988

Related U.S. Application Data

[63] Continuation-in-part of Ser. No. 31,994, Mar. 27, 1987, Pat. No. 4,774,836.

[51] Int. Cl.$^5$ .................... G01W 1/00; B01D 45/00
[52] U.S. Cl. .................... 73/170 R; 73/28.01; 73/31.02
[58] Field of Search .................... 73/170 R, 28, 864.71, 73/865.5, 432.1, 864, 863.21, 863.22

[56] References Cited

U.S. PATENT DOCUMENTS 3,759,617 9/1973 Barringer .................... 73/28 X

FOREIGN PATENT DOCUMENTS 1305470 1/1973 United Kingdom .................... 73/28

OTHER PUBLICATIONS

C. S. Hindes, "Development of an Electromagnetic Water Current Velocity Meter", Conf.: Oceanology International, 3/72.

Primary Examiner—Charles A. Ruehl
Attorney, Agent, or Firm—Cohen & Grigsby

[57] ABSTRACT

A detector for dry deposition of atmospheric contaminants comprised of a surrogate surface upon which the contaminants are deposited from the atmosphere; an airfoil-type surface circumferentially surrounding the surrogate surface and providing a laminar or transition boundary layer flow over the surrogate surface; and a post supporting the surrogate surface and airfoil-type surface in the atmosphere. With the detector, the flux of a contaminant in the atmosphere can then be determined from the area of the surrogate surface and the mass of contaminants collected therefrom over a given time.

16 Claims, 2 Drawing Sheets

DETECTOR FOR DRY DEPOSITION OF ATMOSPHERIC CONTAMINANTS HAVING A COATING CAPABLE OF RETAINING CONTAMINANTS

CROSS REFERENCE TO OTHER APPLICATIONS

This is a continuation-in-part of copending U.S. application Ser. No. 07/031,994, filed Mar. 27, 1987, U.S. Pat. No. 4,774,836.

FIELD OF THE INVENTION

The present invention relates to atmospheric contaminant detectors. More specifically, the present invention relates to an aerodynamically designed surface for monitoring dry deposition of atmospheric contaminants.

BACKGROUND OF THE INVENTION

A complex problem in surrogate surface design is determining the influence of the surface geometry on particle deposition. Other surface design parameters whose influence on particle deposition must be considered include surface roughness, surface electrical charge characteristics, and reactivity of the surface with particulate and gaseous species. In addition, the simplicity of extraction of deposited material for analysis is also of importance.

Based on the simplicity of its geometry, the smooth flat surface presents the fewest complications in modeling particle deposition. Furthermore, the problem of predicting the aerodynamic characteristics of a flat surface in wind tunnels has been studied extensively. Equations for such parameters as velocity profiles, boundary layer thicknesses, and particle deposition rates are well documented (Schlichting, H., "Boundary-Layer Theory"; McGraw-Hill, N.Y., 1979; Hinze, J. O., "Turbulence"; McGraw-Hill, N.Y., 1975; Sehmel, G. A., *J. Colloid Interface Sci.*, 1971, 37, 891–906; Sehmel, G. A., *Aerosol Sci.*, 1973, 4, 125–138; McCready, D. Ph.D. Thesis, Virginia Polytechnic and State University, Blacksburg. Va., 1984; and Lane, D. D., Stukel, J. J., *J. Aerosol Sci.*, 1978, 9, 191–197). Nevertheless, when exposed to the ambient atmosphere. flat plates possess undesirable aerodynamic characteristics which seriously complicate particle deposition predictions.

Wind tunnel visualizations have been performed on a flat plate surrogate surface. Such a surface was constructed so that the deposition plate fit snugly into a recessed aluminum holder. Additionally, the plate holder had a 15° knife edge. The plate and holder were designed to minimize the disturbance of the natural airflow patterns (Davidson, C. I., Lindberg, S. E., Schmidt, J. A., Cartwright, L. G., Landis, L. R., *J. Geophys. Rés.*, 1985, 90, 2123–2130).

At a 0° angle of attack, the flow visualizations showed little disturbance of the natural airflow over the surface. However, even small positive changes ($\leqq 2°$) in the angle of attack resulted in flow separation and extensive surface-induced turbulence at the leading edge of the plate. The presence of these flow disturbances introduce complexities in the calculation of the various aerodynamic parameters and the rate of particle deposition.

SUMMARY OF THE INVENTION

Accordingly, one object of the present invention is to provide a surface that can collect atmospheric contaminants so the flux or deposition velocity of the contaminants from the atmosphere can be predicted given relevant characteristics of the depositing species in the atmosphere.

Another object of the present invention is to provide an atmospheric contaminant detector having a surface that provides for laminar or transition flow over it.

Another object of the present invention is to provide an atmospheric contaminant detector so the flux can be measured.

Another object of the present invention is to provide an atmospheric particle detector having a surface made of a material that is non-reactive to atmospheric contaminants to be detected.

These and other objects of the present invention are attained with a monitor for dry deposition of atmospheric contaminants comprising: a surrogate surface upon which contaminants deposit, said surrogate surface being of a material that is chemically and electrically non-reactive to the contaminants; means for providing a laminar boundary layer over the surrogate surface, said boundary layer means being of a material that is chemically and electrically non-reactive to the contaminants; and means for supporting the surrogate surface and the boundary layer means in the atmosphere, said supporting means causing essentially no disturbance to the atmosphere in the vicinity of the deposition surface. Another embodiment of the monitor allows for the detection of gaseous atmospheric contaminants in the atmosphere.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 is an overhead view of the detector.

FIG. 2 is a side view of the detector.

FIG. 3 is an overhead view of the detector wherein the surrogate surface has grooves therein.

FIG. 4 is a side view of the detector wherein the surrogate surface has an additional layer.

DESCRIPTION OF THE PREFERRED EMBODIMENTS

Referring now to the drawings, wherein like reference numerals designate identical or corresponding parts throughout the several views, and more particularly to FIG. 1 thereof, there is shown a detector 10 for dry deposition of ambient contaminants. The detector 10 is comprised of a surrogate surface 12 upon which contaminants in the atmosphere deposit. The contaminants are carried by wind in the atmosphere to the detector. An airfoil-type surface 14 circumferentially surrounds the surrogate surface and provides laminar flow over the surrogate surface 12. The amount of contaminant deposition collected on the surrogate surface 12 over time can be used to calculate the flux of a contaminant in the atmosphere. The surrogate surface 12 with the circumferentially surrounding airfoil-type surface 14 is supported by a post 16 that maintains it in proper position.

More specifically, the demonstrated susceptibility of flat surfaces to flow separation at small angles of attack resulted in the conception of an airfoil-type surface 14.

The use of an airfoil shape offers at least two advantages: the point of flow separation is extended further downstream on the surface 12 for a wider range of angles of attack; and several numerical models currently exist which predict the aerodynamic characteristics of airfoil shapes.

Typically, a surrogate surface 12 designed to be used in the field must be radially symmetric since the direction of the mean wind is not controlled (as it is in a wind tunnel). Therefore, the standard teardrop-shaped airfoil section was not considered to be a feasible basis for a deposition surface. An airfoil shape was designed by considering a conventional National Advisory Committee for Aeronautics (NACA) three-digit airfoil section from the leading edge back only to the point of maximum thickness. This shape was then rotated about the point of maximum thickness creating a frisbee-shaped symmetrical airfoil. Flow visualizations performed using this shape qualitatively showed that the point of flow separation was, as expected, farther downstream on the surface 12 over a broader range of angles of attack and mean wind velocities than that achieved by the flat plate.

The constraints considered in the airfoil 14 geometry optimization can be separated into three areas: aerodynamic, deposition monitoring, and manufacturing considerations.

The principle aerodynamic constraint is that an adverse pressure gradient, and therefore flow separation, should not develop over the deposition plate 12 portion of the airfoil surface 14. This requires consideration of two factors influencing separation, the range of wind speeds and the angles of attack which can be expected under field conditions. Using the Weibull distributions for wind speed V at over 140 monitoring sites throughout the United States, the specific wind speed $V_x$ was determined such that the cumulative probability $p(V \leqq V_x)$ was equal to b 0.95 (Justus, C. G., Hargraves, W. R., Mikhail, A., Technical Report, Georgia Institute of Technology, Atlanta, 1976). It was established that $V_x$ was approximately 15 m/sec, (consideration was given to 20 m/sec).

For optimization based on angle of attack, initial surface orientation with respect to the mean wind velocity and the influence of atmospheric turbulence were considered. Practical experience has indicated that it is possible to locate the plate within 0.5° of horizontal using a simple bubble level. When positioning the airfoil 14 in flat terrain, where the airflow is parallel to the surface, orientation is not a problem. For sloping terrain with more complex airflow patterns, orienting the surface to avoid angle of attack complications may be difficult. In considering the influence of atmospheric turbulence, Panofsky and Dutton (Panofsky, H. A., Dutton, J. A., "Atmospheric Turbulence", John Wiley and Sons, N.Y., 1984) report that the standard deviation $\sigma_w$ of the vertical velocity w is of the order of 10% of the mean horizontal velocity with a mean vertical velocity w=0. Thus, evaluating over two standard deviations of the vertical component of the flow results in a±8° range of angle of attack. This is not applicable when the surface is located near obstructions which would significantly alter the vertical turbulence spectrum (i.e. buildings, trees, etc.) or during periods when there is strong convection and light winds.

The physical size of the surface 12 is limited by deposition monitoring and manufacturing considerations. The minimum size of the airfoil was limited by the size of the deposition plate 12 positioned at the center of the airfoil 14. Previous research showed that a deposition plate diameter of, for example, 13.3 cm was satisfactory to accumulate sufficient sulfate particles in a period of 24 hours to permit analysis using current techniques (Davidson, C. I., Lindberg, S. E., Schmidt, J. A., Cartwright, L. G., Landis, L. R., *J. Geophys. Res.*, 1985, 90, 2123–2130). Consequently, the minimum preferred size of the surface 14 was limited such that there existed a 13.3 cm diameter flat region in the center of the top of the airfoil 14. The maximum diameter of the airfoil 14 was determined by manufacturing constraints. The computer driven lathes available for use and capable of manufacturing the airfoil 14 limited the maximum diameter to 30.5 cm.

Three materials were considered in the construction of the airfoil 14 and plate 12: aluminum, alloy 304 stainless steel, and Teflon. The final decision was based on factors such as electrical properties, reactivity with depositing species, manufacturing considerations, durability and ease of use in the field.

While the influence electrostatic charge on particle deposition is poorly understood, nevertheless, it is generally accepted that surfaces constructed of highly conducting material which are well grounded will have minimal electrostatic effects. Stainless steel and aluminum are both highly conducting materials and therefore satisfy this criteria. Conversely, Teflon is not suitably conducting. Teflon, however, is considered to be nonreactive with the commonly monitored particulate and gaseous species. Aluminum and stainless steel react with certain gaseous species which could influence deposition measurements. To minimize the electrostatic effects of an inert surface, preferably a very thin (0.003 cm) Teflon coating on the surface of a metallic airfoil 14 and surrogate surface 12 was used.

In the selection of stainless steel or aluminum, the primary considerations were the simplicity of manufacturing and field utility. While stainless steel is harder and therefore more durable, the completed airfoil 14 would weight over 14 kg. Consequently, aluminum was chosen primarily for its lighter weight (completed airfoil weight is about 5 kg). Aluminum was also easier to machine than stainless steel. The final aluminum airfoil 14 was chemically anodized to increase the surface hardness.

The basic airfoil geometry optimization procedure can be separated into four steps:

Selection of airfoil shape

Calculation of the potential flow distribution

Boundary layer calculation

Determination of the point of separation.

The numerical optimization of the airfoil was performed with the constraints, V=15 m/sec and angle of attack=7° of many possible constraints. This combination of mean wind velocity and angle of attack was chosen since flow separation will occur closer to the leading edge of an airfoil for increasing velocity and increasing angle of attack.

The first step in the generation of an airfoil shape to be evaluated was determination of its centerline cross section. This was described using a set of piecewise continuous cubic splines. Some of the constraints on the shape were the airfoil 14 chord length, maximum thickness, and slope of the tangents to the surface at the leading edge and at the top and bottom of the point of maximum thickness. The airfoil shape was then generated by rotating this section about the point of maximum thickness.

Potential flow velocity and pressure distributions were determined for two cross-sections of the resulting airfoil shape 14. The first was the centerline cross section. The second was the airfoil cross section at the edge of the deposition plate. The potential flow velocity and pressure distributions were calculated using a finite-element algorithm based on the classic Smith-Hess Panel Method. Details of this method are contained in Hess, J. L., Smith, A. M. O., *Prog. Aerosol Sci.*, 1966, 8, 1–138. The resulting velocity and pressure distributions were used as input to the boundary layer calculations.

The boundary layer calculations were performed using Thwaites method for the momentum integral solution of the two-dimensional Navier-Stokes Equations for incompressible flow. This procedure is presented in Thwaites, B., *Aero. Quart.*, 1949, 1, 245–280. The calculated values of the momentum boundary layer thickness and displacement boundary layer thickness were subsequently used as input parameters in Michel's empirical correlation for determining airfoil boundary layer transition to turbulent flow (Cebici, T, Bradshaw, P., "Momentum Transfer in Boundary Layer", McGraw-Hill, Washington, D.C., 1977).

After performing the calculations for each generated shape, the shape having the furthest downstream point of separation was selected. A drawing of the resulting airfoil geometry is shown in FIG. 1.

Since this is a two-dimensional analysis, the three-dimensional flow effects (i.e., airfoil tip roll vortices) were ignored. It was assumed that these would not influence that point of flow separation significantly. While roll vortices were noted at the airfoil edges during flow visualizations on the final prototype design, they were not observed over the deposition surface.

An airfoil-type detector could be used for other applications, besides measuring the flux and deposition velocity of a contaminant. (The deposition velocity is related to the rate at which contaminants are deposited on the surface. To be precise, the deposition velocity is the ratio of the mass of contaminant collected per unit time per unit area divided by the airborne concentration in units of mass of contaminant per unit volume of air). An example of some other applications are that the change in deposition velocity over time can be determined. Also, since the primary vehicle for movement of a contaminant particle in a laminar or transition boundary layer is the sedimentation velocity (for certain ranges of particle size the sedimentation velocity equals the deposition velocity), it can be isolated for analysis purposes of deposition models that have additional vehicles for contaminant movement.

The surrogate surface 12 can be modified to better retain the atmospheric contaminants that are deposited thereon. For instance, the surrogate surface 12 could have a coating applied to it. The coating has the ability of retaining the atmospheric contaminants that deposit on the surrogate surface 12. Preferably, the coating consists of the material Apiezon-L TM that covers the surrogate surface 12.

Alternatively, grooves 18, as shown in FIG. 3 are disposed in the surrogate surface 12. The grooves 18 aid in the retention of atmospheric contaminants that are deposited on the surrogate surface 12. Additionally, instead of grooves 18, the surrogate surface 12 could have a coarseness such that the atmospheric contaminants are retained by the surrogate surface 12 after they are deposited thereon.

In another embodiment, the detector 10 can be used with respect to gaseous atmospheric contaminants. Preferably, in this embodiment, the surrogate surface 12 has a layer 20 disposed on the surrogate surface 12 that is capable of collecting gaseous atmospheric contaminants. A different type of layer 20 would be used with respect to the type of gas that is being monitored. For instance, if nitric acid vapor in the atmosphere is being monitored, a nylon layer is preferably disposed on the surrogate surface 18. The nylon layer could be attached to the surrogate surface 12 with tape or adhesive.

Obviously, numerous (additional) modifications and variations of the present invention are possible in light of the above teachings. It is therefore to be understood that within the scope of the appended claims, the invention may be practiced otherwise than as specifically described.

What is claimed is:

1. A monitor for dry deposition of atmospheric contaminants comprising:

a surrogate surface upon which the contaminants deposit, said surrogate surface having a coating that is capable of retaining the contaminants;

means for providing a laminar boundary layer over the surrogate surface; and means for supporting the surrogate surface and the boundary layer means in the atmosphere, said supporting means causing essentially no disturbance to the atmosphere in the vicinity of the deposition surface.

2. A monitor for dry deposition of atmospheric contaminants comprising:

a surrogate surface upon which the contaminants deposit, said surrogate surface having a coating that is capable of retaining the contaminants;

means for providing a transition boundary layer over the surrogate surface; and means for supporting the surrogate surface and the boundary layer means in the atmosphere, said supporting means causing essentially no disturbance to the atmosphere in the vicinity of the deposition surface.

3. A monitor as described in claims 1 or 2 wherein the coating is Apiezon-L.

4. A monitor as described in claim 3 wherein the boundary layer means is made of a material that is nonreactive to the contaminants.

5. A monitor as described in claim 4 wherein the surrogate surface is radially symmetric.

6. A monitor as described in claim 5 wherein the boundary layer means is an air foil-type surface that circumferentially surrounds the surrogate surface.

7. A monitor as described in claim 6 wherein the surrogate surface has an underside, and the support means is a support post, said post being attached to the underside of the surrogate surface.

8. A monitor as described in claim 7 wherein the boundary layer means is made of aluminum, alloy 304 stainless steel or Teflon.

9. A monitor as described in claim 8 wherein the atmosphere has wind currents and the boundary layer means is able to maintain a laminar boundary layer over the surrogate surface for wind currents up to 20 m/sec. and an angle of attack up to 10 degrees.

10. A monitor for gaseous atmospheric contaminants comprising:

a surrogate surface upon which the gaseous contaminants collect, said surrogate surface having a layer thereupon to collect the gaseous contaminants;

means for providing a transition boundary layer over the surrogate surface; and means for supporting the surrogate surface and the boundary layer means in the atmosphere, said supporting means causing essentially no disturbance to the atmosphere in the vicinity of the collection surface.

11. A monitor for gaseous atmospheric contaminants comprising:

a surrogate surface upon which the gaseous contaminants collect, said surrogate surface having a layer thereupon to collect the gaseous contaminants;

means for providing a transition boundary layer over the surrogate surface; and means for supporting the surrogate surface and the boundary layer means in the atmosphere, said supporting means causing essentially no disturbance to the atmosphere in the vicinity of the collection surface.

12. A monitor as described in claims 10 or 11 wherein the layer is made of nylon.

13. A monitor for dry deposition of atmospheric contaminants comprising:

a surrogate surface upon which the contaminants deposit, said surrogate surface having grooves that are capable of retaining the contaminants;

means for providing a laminar boundary layer over the surrogate surface; and means for supporting the surrogate surface and the boundary layer means in the atmosphere, said supporting means causing essentially no disturbance to the atmosphere in the vicinity of the deposition surface.

14. A monitor for dry deposition of atmospheric contaminants comprising:

a surrogate surface upon which the contaminants deposit, said surrogate surface having grooves are capable of retaining the contaminants;

means for providing a transition boundary layer over the surrogate surface; and means for supporting the surrogate surface and the boundary layer means in the atmosphere, said supporting means causing essentially no disturbance to the atmosphere in the vicinity of the deposition surface.

15. A monitor or dry deposition of atmospheric contaminants comprising:

a surrogate surface upon which the contaminants deposit, said surrogate surface being of a coarseness such that contaminants are capable of being detained by the surrogate surface;

means for providing a laminar boundary layer over the surrogate surface; and means for supporting the surrogate surface and the boundary layer means in the atmosphere, said supporting means causing essentially no disturbance to the atmosphere in the vicinity of the deposition surface.

16. A monitor for dry deposition of atmospheric contaminants comprising:

a surrogate surface upon which the contaminants deposit, said surrogate surface being of a coarseness such that contaminants are capable of being retained by the surrogate surface;

means for providing a transition boundary layer over the surrogate surface; and means for supporting the surrogate surface and the boundary layer means in the atmosphere, said supporting means causing essentially no disturbance to the atmosphere in the vicinity of the deposition surface.

* * * * *